(12) United States Patent
Young et al.

(10) Patent No.: US 7,668,924 B1
(45) Date of Patent: Feb. 23, 2010

(54) METHODS AND SYSTEM FOR INTEGRATING SAN SERVERS

(75) Inventors: Eric R. Young, Alexandria, VA (US); Norris V. Li, Newton, MA (US)

(73) Assignee: EMC Corporation, Hopkinton, MA (US)

( * ) Notice: Subject to any disclaimer, the term of this patent is extended or adjusted under 35 U.S.C. 154(b) by 671 days.

(21) Appl. No.: 11/233,292

(22) Filed: Sep. 22, 2005

(51) Int. Cl.
*G06F 15/167* (2006.01)
*G06F 15/16* (2006.01)

(52) U.S. Cl. ........................ 709/212; 709/219
(58) Field of Classification Search ............... 709/212, 709/219
See application file for complete search history.

(56) References Cited

U.S. PATENT DOCUMENTS 6,823,349 B1 * 11/2004 Taylor et al. ............... 707/204
7,069,468 B1 * 6/2006 Olson et al. ................. 714/7
7,124,179 B1 * 10/2006 Bauer et al. ................ 709/223

* cited by examiner

*Primary Examiner*—Joon H Hwang
*Assistant Examiner*—Jasmine Myers
(74) *Attorney, Agent, or Firm*—Chapin IP Law, LLC (57) ABSTRACT

Multiple servers such as a main server as well as one or more corresponding sub-servers manage configuration information associated with a storage area network. A sub-server operates differently depending on whether the sub-server has been "integrated" with a main server in the storage area network. For example, in response to detecting a presence of a main server in the storage area network and that the corresponding sub-server has been integrated with the main server, a respective sub-server initiates execution of at least a portion of function calls associated with a respective service at the main server in lieu of executing the function calls locally at the respective sub-server. In the absence of the main server and/or integration, the sub-server operates independently and executes function calls locally rather than forward function calls associated with a respective service to the main server.

17 Claims, 8 Drawing Sheets

METHODS AND SYSTEM FOR INTEGRATING SAN SERVERS

BACKGROUND

Information services and data processing industries in general have rapidly expanded as a result of the need for computer systems to manage and store large amounts of data. As an example, financial service companies such as banks, mutual fund companies and the like now, more than ever before, require access to many hundreds of gigabytes or even terabytes of data and files stored in high capacity data storage systems. Data storage system developers have responded to the increased need for storage by integrating high capacity data storage systems, data communications devices (e.g., switches), and computer systems (e.g., host computers or servers) into networks called "storage networks" or "Storage Area Networks" (SANs).

In general, a so-called storage area network is a collection of data storage systems that are networked via a switching fabric to a number of host computer systems operating as servers. During operation, the host computers access data stored in the data storage systems on behalf of client computers that request data from the data storage systems. For example, according to conventional techniques, upon receiving a storage access request, a respective host computer accesses a large repository of storage through the switching fabric on behalf of the requesting client. An access can include a read or write of data to storage.

Conventional storage area network management applications typically include a graphical user interface (GUI) that enables a network manager to graphically manage, control, and configure various types of hardware and software resources associated with a corresponding managed storage area network. For example, conventional network management storage applications generate a graphical user interface utilized by a network manager to graphically select, interact with, and manage local or remote devices and associated software processes associated with the storage area network.

Based on use of the graphical user interface in combination with an input device such as a hand operated mouse and corresponding pointer displayed on a viewing screen, a network manager can "click" on managed object icons in a respective graphical user interface to manage respective hardware and software entities such as file systems, databases, storage devices, peripherals, network data communications devices, etc., associated with the storage area network. In some storage area networks, a network management station and associated management software allows a network administrator or systems manager (a person responsible for managing the storage network) to allocate and de-allocate resources (e.g., hardware and software resources) in a storage area network. Consequently, the network manager can reconfigure a SAN according to users' respective present needs.

The infrastructure required to support access to data in a storage area network can be quite complex. For example, as discussed above, consider the number of hardware and software components that must work in harmony in order for a user's software application executing on a host computer system to successfully access data stored in a storage array of a SAN. To access such data, the user application provides file system calls or requests (e.g., open, read, write and so forth) to a file system resource presented to the user application by an operating system executing on the host computer system. The file system receives the file system calls and operates to map such file system calls to a series of I/O requests. The operating system on the host computer system transmits the I/O requests through a host interface device resource, such as an interface card (e.g., SCSI or FibreChannel adapter) having one or more I/O port resources, across an interface cable or networking medium (e.g., in a storage area network implementation) to a front-end adapter interface card resource operating within a high-capacity data storage array of the SAN. The front-end adapter interface card receives the I/O requests and interprets them to identify appropriate data locations within specific storage device resources contained in the storage array.

After the requested data is accessed via the storage devices, respective I/O responses are returned to the user application along an information or data flow path (based on operations and processing functionality provided by each of the aforementioned components and resources) in a reverse direction back to the application on the host computer running the client application. In this way, access to data in a conventional storage area network involves reliance on a proper operation and coordination of a multitude of software and hardware resources in a storage area network to retrieve data from storage and serve the data to a client.

One conventional way to manage a respective storage area network involves use of a management control center (such as a computer station) to maintain storage area network configuration information at a central location of the storage area network. In general, the management control center must keep track of all current configuration settings associated with the storage area network. Upon receipt of a respective query from a network administrator about current configuration information through a graphical user interface application, the management control center serves appropriate configuration views to the network administrator. Accordingly, the network administrator can view and modify current settings associated with the storage area network.

SUMMARY

Management of a storage area network can be a challenge due to the complex network of corresponding resources that must be configured so that the storage area network supports proper access to stored data. For example, as discussed above, a storage area network typically includes a multitude of storage area network resources (such as respective resources in a path between a host resource and storage array) working in harmony so that a host resource (e.g., server) of the storage area network can access data from the storage arrays on behalf of requesting clients. If even a single resource in the storage area network is not properly configured in a long chain of respective resources, a client in communication with a host resource of the storage area network may not be able to access data in the storage area network.

One drawback associated with the conventional way of managing the storage area network at a single central location is the potential tremendous amount of configuration information that must be continuously collected and maintained by a respective centrally located management control center. Collection and storage of the configuration information at a centrally located management control center requires communicating with many different types of hardware and software resources. Accordingly, such a topology does not always scale well when a storage area network is expanded to include additional storage area network resources.

The following disclosure includes several useful embodiments (e.g., a framework) supporting distribution of management duties amongst multiple servers. More specifically, one embodiment herein includes a main server as well as one or more corresponding sub-servers that manage configuration information associated with a respective storage area network. A network administrator connects, via a remote browser, to the main server or one of the corresponding sub-servers to manage the configuration information via use of a graphical user interface. Each of the one or more sub-servers can operate independently of the main server to perform certain management tasks as well as operate in unison with the main server to carry out other management tasks. According to one embodiment, the "main" server is a single authoritative server in the storage area network for coordinating amongst the multiple storage area network servers and carrying out certain management tasks.

Initially, a storage area network may not include a so-called main server (a.k.a., an integrated server) but may include one or more independently operating servers to manage the storage area network. In this embodiment, a network administrator can log onto an independent server (a.k.a., a standalone server) and perform management functions via use of a respective graphical user interface served from the independent server to a respective browser. The application associated with the graphical user interface typically supports calls to functions that are executed locally by the independent server to carry out respective management tasks.

A storage area network can evolve over time to include a main server as discussed above. For example, in certain instances, the storage area network may eventually need to include a single authoritative server amongst multiple storage area network servers to carry out certain types of management tasks to avoid contention amongst multiple storage area network servers. One purpose of including the so-called main server in the storage area network is to prevent lockout conditions, data corruption, etc.

According to one embodiment herein, the initial inclusion of the main server in the storage area network amongst one or more existing independent servers prompts a need for "integration" of the one or more independent servers with the main server. That is, the independent servers as discussed above, at least to some extent, become configured as sub-servers (e.g., subservient servers) with respect to the main server after inclusion of the main server in the storage area network. Even though the independent servers become so-called sub-servers in the presence of the main server, the sub-servers can still perform certain management tasks independent of the main server as well as certain management tasks performed in cooperation with the main server.

According to one embodiment, the "integration" process entails providing notification to each of the one or more independent servers of a presence of the main server. In response to learning of the presence of the main server, rather than continue to locally execute all function calls associated with an application running on a respective sub-server, the respective sub-server initiates execution of at least a portion of function calls at the main server. For example, for a given service in which all corresponding functions calls were previously executed locally in the absence of the main server, the respective sub-server now designates a first portion of function calls associated with the given service to be executed by the sub-server and designates a second portion of function calls associated with the given service to be executed by the remote server. Thus, certain duties of executing function calls associated with the given service in the presence of the main server are split amongst the sub-server and the main server.

As discussed above, according to one embodiment, each of multiple sub-servers become "integrated" with the main server. According to further embodiments herein, the main server as well as each of the sub-servers in the storage area network each can support a common set of services used by a respective one or more applications to carry out management tasks. As mentioned, the application running on the sub-server uses respective function calls to implement a particular one of the common services. Thus, software developers can produce respective applications (which use the services) that can run on any server because each server supports a common set of services. During operation of a respective application, the server supporting the respective application determines whether to locally (at the sub-server) or remotely (at the main server) execute the function calls for each service of the common services. As mentioned, in one embodiment, this depends on whether the independent server has been integrated with respect to a main server in the storage area network.

Note that techniques herein are well suited for use in applications such as management of storage area networks and specific applications as discussed herein. However, it should be noted that embodiments herein are not limited to use in such applications. Thus, embodiments herein and deviations thereof are well suited for other applications as well.

Other examples of the present application include a computerized device (e.g., a host computer, workstation, etc.) configured to support the aforementioned method operations disclosed herein as embodiments of the present disclosure to facilitate integration of servers in a storage area network. In such embodiments, the computerized device such as a server includes a memory system, a processor (e.g., a processing device), and an interconnect. The interconnect supports communications among the processor and the memory system. The memory system is encoded with an application that, when executed on the processor, produces a process that enables the server to selectively execute a respective function call or forward the function call to a remote server (e.g., the main server) for execution depending on whether a main server is present in the storage area network.

Yet other embodiments of the present disclosure include software programs to perform the method embodiment and operations summarized above and disclosed in detail below under the heading Detailed Description. More particularly, a computer program product (e.g., a computer-readable medium) including computer program logic encoded thereon may be executed on a computerized device to facilitate execution of a management function as explained herein.

The computer program logic, when executed on at least one processor with a computing system, causes the processor to perform the operations (e.g., the methods) indicated herein as embodiments of the present disclosure. Such arrangements as further disclosed herein are typically provided as software, code and/or other data structures arranged or encoded on a physical computer readable storage medium (such as an optical medium (e.g., CD-ROM), floppy or hard disk) or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein.

One more particular embodiment of the present application is directed to a computer program product that includes a computer readable medium having instructions stored thereon for supporting management of information associated with a storage area network. The instructions, when carried out by a processor of a respective computer device, cause the processor to perform the steps of: i) detecting a presence of a remote server operating in the storage area network; and ii) in response to detecting the presence of the remote server, for a given service of multiple services supported by the local server: a) designating a first portion of function calls associated with the given service to be executed by the local server, and b) designating a second portion of function calls associated with the given service to be executed by the remote server, the local server acting as a proxy to execute the second portion of function calls at the remote server.

Other embodiments of the present application include software programs to perform any of the method embodiment steps and operations summarized above and more particularly disclosed in detail below.

It is to be understood that the system of the present application can be embodied solely as a software program, or as a software program operating in conjunction with corresponding hardware. For example, embodiments of the present application may be implemented in EMC's Control Center (ECC) software application that provides graphical management functionality of storage area network resources. Embodiments of the present application may also be implemented in computer devices that operate the Control Center (ECC) software. Control Center software is manufactured by EMC Corporation of Hopkinton, Mass., USA.

BRIEF DESCRIPTION OF THE DRAWINGS

The foregoing and other objects, features and advantages of the present application will be apparent from the following more particular description of preferred embodiments, as illustrated in the accompanying drawings in which like reference characters refer to the same parts throughout the different views. The drawings are not necessarily to scale, with emphasis instead being placed upon illustrating example embodiments, principles and concepts.

DETAILED DESCRIPTION

According to one embodiment, multiple servers such as a main server as well as one or more corresponding sub-servers share duties of managing configuration information associated with a storage area network. A sub-server (e.g., a server other than the main server) operates differently depending on whether a corresponding sub-server has been "integrated" with a main server in the storage area network. For example, in response to detecting a presence of a main server in the storage area network and that the corresponding sub-server has been integrated with the main server, a respective sub-server initiates execution of at least a portion of function calls associated with a respective service at the main server in lieu of executing the function calls locally at the respective sub-server. In the absence of the main server and/or integration, the sub-server operates independently and executes function calls locally rather than forwards function calls associated with a respective service to the main server.

Figure 1:
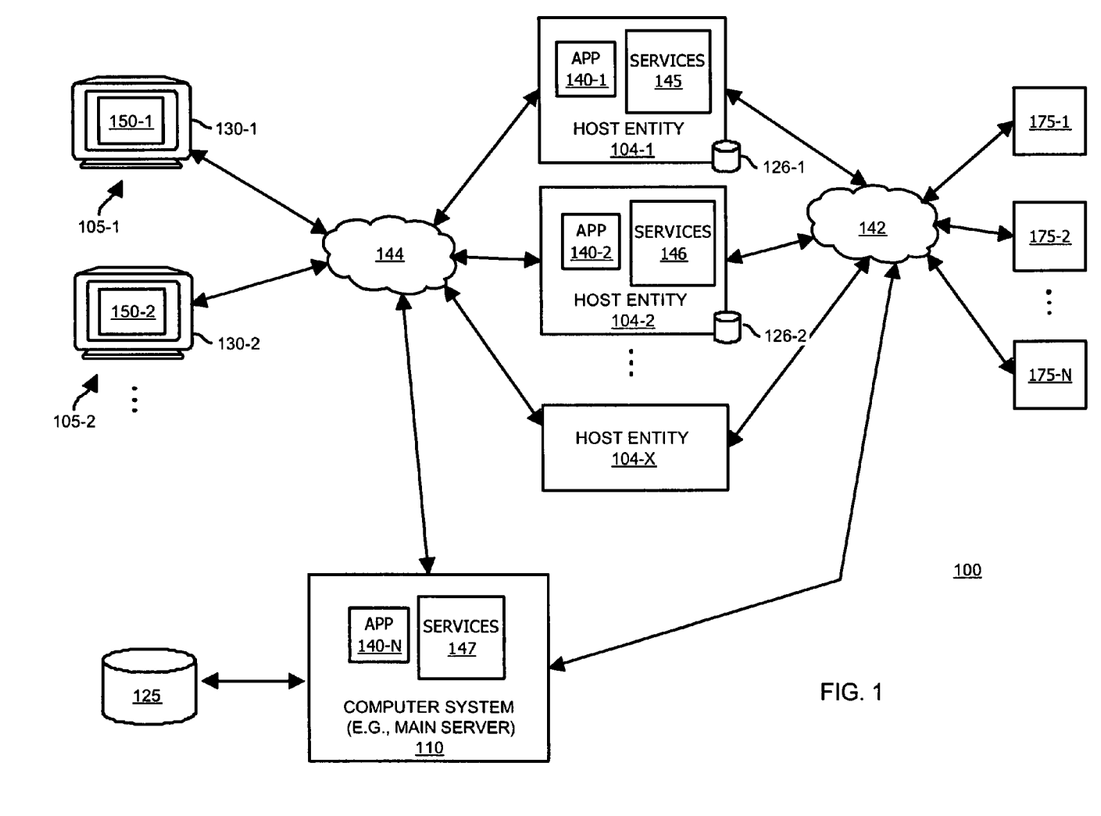
FIG. 1 is a block diagram of a storage area network environment configured to operate according to an embodiment herein.

FIG. 1 illustrates a storage area network environment 100 suitable for explaining an operation of example embodiments herein. As shown, storage area network environment 100 (e.g., potentially including multiple types of networks) includes a network medium 142 such as a high-speed data communications medium (e.g., Ethernet, optical network, or other type of network) that interconnects a plurality of components such as host entities 104-1 (e.g., servers), 104-2, . . . , 104-X (collectively, host devices 104) to respective storage resources 175-1, 175-2, . . . , 175-N (collectively, storage resources 175). During operation, respective clients access data from storage systems 175 through the respective host entities 104.

In addition to supporting access to stored data, host entities 104 can include hardware and/or software resources to support management of storage area network resources such as storage systems 175. To support management of storage area network environment and its resources, host entity 104-1 includes application 140-1 and associated services 145. Host entity 104-2 includes application 140-2 and associated services 146. Host entity 140-x is not configured to include an application and corresponding service. In one embodiment, the associated services 145 at each of the respective servers (e.g., host entities 104 and computer system 110) is the same. However, according to other embodiments herein, the services at each respective server can be different.

Note that, a respective host entity 104 can include none, one, or more respective applications 140 for managing storage area network environment 100 depending on a respective storage area network configuration. Also, according to one embodiment, note again that the host entities 104 and the computer system 110 support a common set of services 145 to carry out management tasks according to one embodiment herein. That is, services 145 on each different server are identical. Thus, software developers can produce respective applications 140 that utilize function calls associated with the common services so that the applications 140 can run on any of the storage area network servers (e.g., host entities 104 and/or computer system 110).

An example of services 145 include services such as user account management, authorization, reserve, auditing, event management, alert management, event policy action management, integrated service, data synchronization service, data collection policy, and user preferences. As mentioned, these services enable respective applications to manage (based on user input, triggering events, etc.) the storage area network environment 100.

Computer system 110 includes application 140-N and associated services 147. In general, as will be further discussed, the application 140-N associated with computer system 110 as well as application 140-1, application 140-2, . . . , application 140-N associated with host entities 104 enable respective users such as network administrators at respective one or more stations 105 to manage configuration information associated with storage area network environment 100. Thus, duties of managing configuration information can be distributed amongst the multiple host entities 104 (as well as computer system 110) rather than being performed only by a centrally located server such as computer system 110. In other words, duties of managing configuration information associated with respective storage systems 175 can be assigned to applications 140 that each process and store respective configuration information in respective locally managed repositories 126.

In one embodiment, the respective applications 140 store the configuration information in one or more of storage systems 175 in lieu of a repository 126 residing at the same location as the host entity 104. Duties of managing configuration information (such as zoning, LUN masking, etc.) at the storage area network system level can be assigned to application 140-N that stores the respective configuration information in repository 125 of computer system 110.

Stations 105 can reside at remote or local locations with respect to respective host entities 104 and computer system 110. In the current example, a network administrator utilizes a graphical user interface 150 such as a browser to manage at least a portion of the storage area network resources. According to one embodiment, each respective application 140 supports generation of a respective graphical user interface 150 (e.g., a browser) for viewing on a respective display screen 130.

As an example, a network administrator at station 105-1 can initiate execution of application 140-1 to manage configuration information associated with storage area network environment 100 or, more specifically, storage system 175-1. Upon execution, application 140-1 generates a respective graphical user interface 150-1 on display screen 130-1 for the network administrator to view and modify configuration settings of storage area network environment 100. In one embodiment, application 140-1 initiates display of information on display screen 130-1 via transmission of data in respective XML (Extensible Markup Language) files. Other applications can operate in a similar way.

As briefly mentioned, according to one embodiment, the application 140-1 uses services 145 to carry out different management tasks. For example, the user at station 105-1 provides input such as commands through a respective graphical user interface 150-1. The commands input to application 140-1 prompt execution of function calls supported by respective services 145. As will be further discussed, the function calls generated by application 140-1 can be executed locally in the respective host entity 104-1 or, alternatively, executed remotely at a site such as computer system 110.

In one embodiment, computer system 110 is configured as a "main" server (e.g., an integrated server). At least for certain tasks, the host entities 104 are subservient to the main server (e.g., computer system 110) for execution of certain management tasks in the storage area network environment 100. Typically, the host entities 104 each can independently manage a first set of tasks that have no effect on other servers, but must rely on cooperation with the main server (i.e., computer system 110) to carry out a second set of tasks. According to one embodiment, computer system 110 is a single authoritative server in the storage area network environment 100 for coordinating execution of certain tasks among the servers to avoid lockouts, data corruption, etc.

Figure 3:
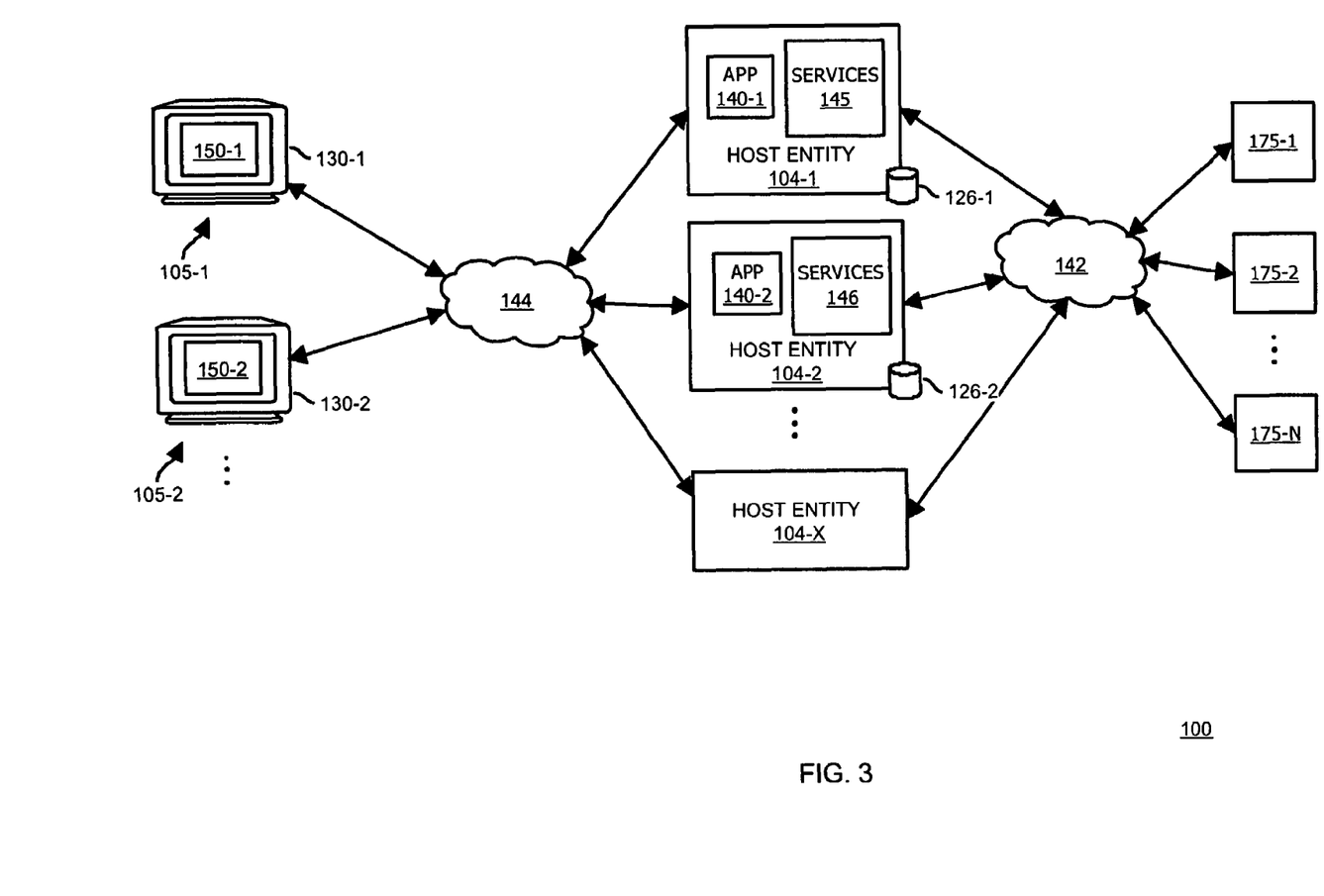
FIG. 3 is a block diagram of a storage area network environment prior to inclusion of a main server according to an embodiment herein.

Initially, a storage area network may not include computer system 110 (e.g., a main server) but may include host entities 104 and corresponding application 175 to manage the storage area network as shown in FIG. 3. According to this configuration, a network administrator can log onto an independent server (a.k.a., a standalone server such as host entity 104-1) and perform management functions via use of a respective graphical user interface 150 served from the host entity 104 to a respective station 105. In the absence of computer system 110, a respective application 140 associated with a host entity 104 supports calls to functions that are executed locally by the host entity 104 to carry out respective storage area network management tasks rather than forward a respective function call to the computer system 110. FIG. 3 is an example diagram of storage area network environment 100 prior to inclusion of computer system 110.

Prior to integration of host entity 104-1 with a corresponding main server (e.g., computer system 110) in the storage area network, the host entity 104-1 can detect that a respective main server is not yet present in the storage area network. In this case, for a given service of multiple services 145 supported by the host entity 104-1, the host entity 104-1 designates function calls (e.g., all function calls associated with one or more services) to be executed at the host entity 104-1 in lieu of forwarding the function calls to computer system 110.

A storage area network environment 100 as shown in FIG. 3 can evolve over time to include a main server as discussed above for FIG. 1. For example, in certain instances, the storage area network environment 100 may eventually need a single authoritative server such as computer system 110 amongst host entities 104 to carry out certain types of management tasks to avoid contention amongst multiple servers attempting to perform the same task without an accounting for each other. For example, as discussed, computer system 110 can serve as an arbitrator for management tasks requiring a single central authority.

According to one embodiment herein, the initial inclusion of computer system 110 in the storage area network environment 100 amongst already existing host entities 104 prompts "integration" of the one or more host entities 104 with computer system 110 acting as a main server. That is, for some management tasks, the host entities 104 become configured to forward function calls to computer system 110 for execution rather than execute the respective functions locally at a respective host entity.

Note however that even though the host entities 104 become "integrated" and forward certain function calls with respect to corresponding services 145 to computer system 110, the host entities 104 can still perform certain management tasks independent of computer system 110 without forwarding other types of function calls.

According to one embodiment, the "integration" process entails providing notification to each of the host entities 104 of a presence of computer system in storage area network environment 100. In response to learning of the presence of computer system 110, rather than continue to execute all function calls locally, a respective host entity 104 or, more specifically, application 140 initiates execution of at least a portion of function calls at the computer system 110. That is, for a given service of services 145 in which all corresponding functions calls were previously executed locally in the absence of computer system 110, the respective host entity 104 now designates a first portion of function calls associated with the given service to be executed locally at the host entity 104 and designates a second portion of function calls associated with the given service to be executed by a remote server in storage area network environment 100 such as computer system 110. Thus, certain duties of executing function calls associated with the given service in the presence of the main server are split amongst a respective host entity 104 and computer system 110. As discussed above, according to one embodiment, each of multiple independent servers (e.g., host entities 104) can become "integrated" with respect to a main server in storage area network environment 100.

Figure 2:
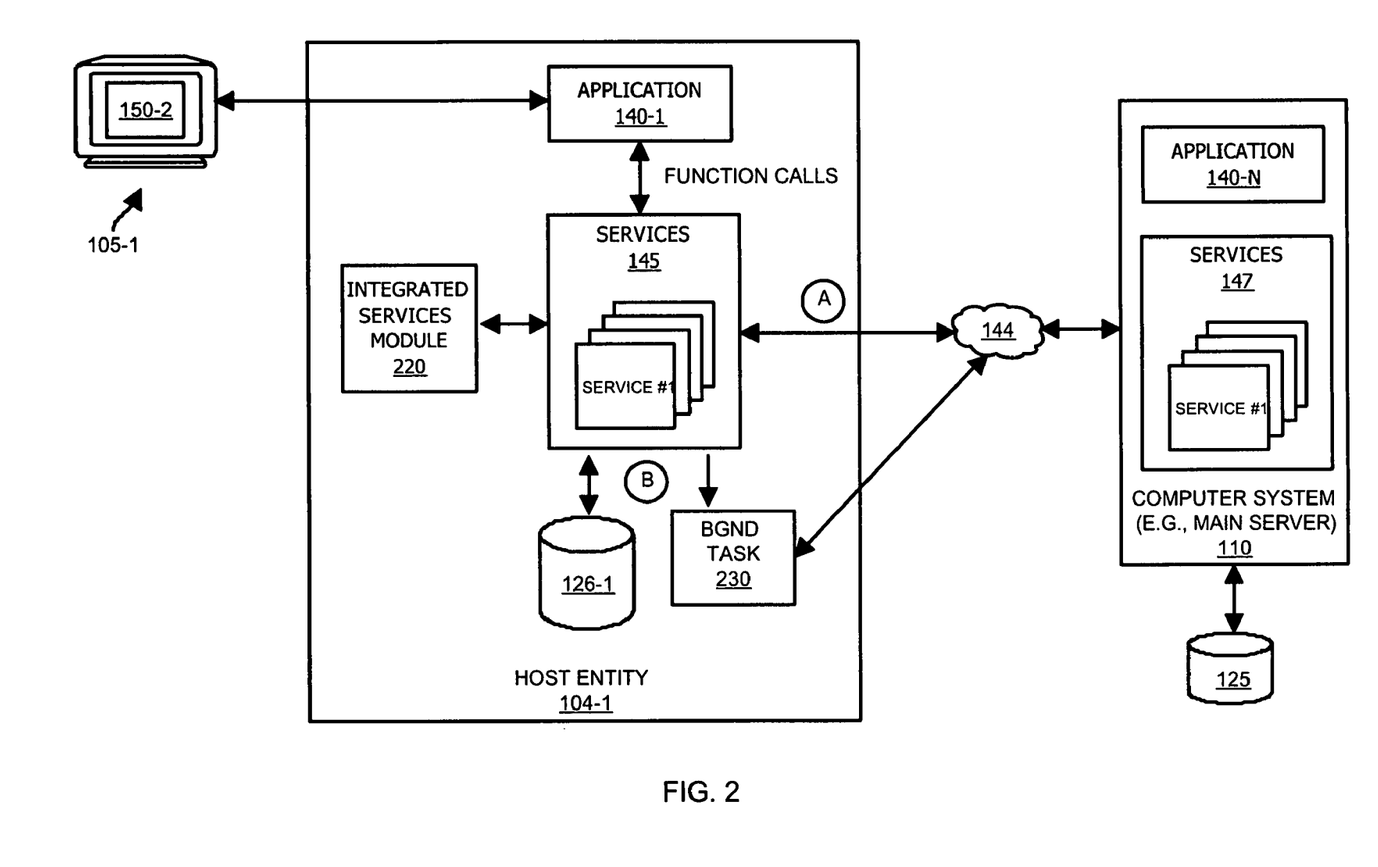
FIG. 2 is a block diagram of multiple services executing in a respective server that supports local execution of certain function calls and remote execution of other function calls according to an embodiment herein.

FIG. 2 is a diagram illustrating how an application in a host entity 104 carries out management tasks via use of services 145 according to an embodiment herein. As shown, host entity 104-1 includes an integrated services module 220 that provides an indication to services 145-1 whether the respective host entity 104-1 has been "integrated" with computer system 110 and, if so, which function calls associated with services 145 should be executed locally at host entity 104-1 versus which function calls associated with services 145 should be executed remotely at computer system 110. Prior to integration, all function calls are executed locally at host entity 104-1.

As mentioned, forwarding of a respective function call to computer system 110 is beneficial in situations that require a single authoritative source to manage tasks such as creation, deletion, access, etc. to specific sets of data (e.g., configuration information) associated with storage area network environment 100. For example, it is beneficial to include computer system 110 in storage area network environment 100 as a main server when host entities 104 manage shared data and cannot guarantee a lock condition to prevent corruption of the data as a result of multiple sources simultaneously modifying the same data.

In one embodiment, services 145 of host entity 104-1 query integrated services module 220 whether to locally execute a corresponding function call received from station 105-1 or forward the function call to computer system 110 for execution. For example, case A illustrates a mode in which a respective one of the services 145 acts as a proxy and forwards the received function call to computer system 110 for implementing a respective service. Case B illustrates a mode in which one of the respective services 145 executes a received function call locally at host entity 104-1 to implement a respective service.

As an example for case A, assume that receipt of input from a user at station 105-1 (or input form a hardware device, a software application, etc.) prompts the application 140-1 to initiate execution of a respective function call associated with one of the services 145. Note that each service of services 145-1 can include multiple associated function calls.

Upon receipt of the respective function call from application 140-1, the respective service checks with integrated services module 220 whether to execute the respective function call locally or forward the respective function call to computer system 110 for execution. In this case, assume that the integrated services module 220 indicates to forward the function call from application 140-1 to computer system 110.

In one embodiment, forwarding the received function call to computer system 110 entails putting a respective event associated with the function call onto a bus (e.g., an industry standard subscription bus) supported by network 144 and corresponding communication links between host entity 104-1 and computer system 110. Computer system 110 monitors the bus for the event. Upon detection of the event, the computer system 110 handles the event as an application programming interface function call and returns a corresponding reply message (e.g., a structured packet of information) back onto the bus. Thus, computer system 110 executes the function call and sends a reply back to host entity 104-1. Note that one way of implementing the above technique of communicating between the host entity 104-1 and the computer system 110 is via use of JMS (Java Messaging Service).

Via this client/server type architecture (in which the respective service is the client and computer system 110 is the server), the respective service originally issuing the respective function call receives the reply message (e.g., by observing the bus) and passes the respective information associated with the reply message up to application 140-1.

As an example for case B, assume that input to application 140-1 prompts the application 140-1 to initiate execution of a function call associated with a respective one of the services 145. Note again that each service of services 145 can include one or multiple associated function calls.

Upon receipt of a function call from application 140-1, the respective service checks with integrated services module 220 whether to execute the function call locally or forward the function call to computer system 110 for execution. In this example (for case B), assume that the integrated services module 220 indicates to service the function call locally rather than at computer system 110.

In one embodiment, during local execution of the received function call, the respective service initiates retrieval of data from repository 126-1. The respective service then passes the data to application 140-1.

In another embodiment, a local execution of the function call by the respective service at host entity 104-1 results in modifications to data in repository 126-1. Prior to completing the function call and making the modifications to data (e.g., managed objects) in repository 126-1, the respective service executing the function call sets up (via a handshaking type of process) background task 230 to notify other entities such as computer system 110 and/or other host entities 104 regarding any changes that have been or will be made to repository 126-1. Storage of data modifications in repository 126-1 triggers background task 230 to distribute the data modifications to other servers. Thus, background task 230 ensures that appropriate repositories such as repository 126-1 and repository 125 in storage area network environment 100 are synchronized.

Note that communication link failures between host entity 104-1 and computer system 110 can result in an inability of the host entity 104-1 to forward function calls for execution or notify computer system 110 of data modifications. During such an event, the host entity 104-1 can still operate properly at a local level (e.g., to modify contents of repository 126-1) even though the host entity 104-1 no longer will be unable to act as a proxy that forwards certain function calls to computer system 110 for execution. Additionally, note that background task 230 will not be able to forward modification information to the other servers in storage area network environment 100 during the failure.

Upon revival of a previously failing communication link, the services 145 associated with host entity 104-1 can propagate changes with respect to repository 126-1 out to computer system 110 or other host entities 104. In other words, after one or more previously failing communication links is back up, the host entity 104-1 distributes (e.g., via background task 230 or other synchronization mechanism) modifications made to repository 126-1 during the link failure. If the modifications result in a data conflict, then a software process associated with either or both of host entity 104-1 and computer system 110 resolves the conflicts to the extent possible. Host entity 104-1 notifies a respective user at application 140-1 (and potentially other users or resources) of any "modification" conflicts that are non-resolvable via the software process.

Accordingly, one embodiment herein involves inclusion of an integrated services module 220 at host entity 104-1 that detects a presence of a remote server (e.g., computer system 110) operating in the storage area network environment 100. In response to detecting the presence of the remote server and/or that the host entity 104-1 has been integrated with main server computer system 110, for a given service of multiple services 145-1 supported by host entity 104-1, the integrated services module 220: a) designates a portion of function calls associated with the given service to be executed by the remote server, and b) designates a portion of function calls associated with the given service to be executed by the local server. In the first case (e.g., case A), the host entity 104-1 (e.g., local server) acts as a proxy to execute the portion of function calls at the computer system 110 (e.g., remote server). In the absence of detecting a presence of computer system 110 in storage area network environment 100 and/or that the host entity 104-1 has been not been integrated with main server computer system 110, integrated services module 220 designates function calls associated with the services 145 locally in the host entity 104-1 instead of forwarding them to computer system 110 for execution.

Based on the above discussion, embodiments herein therefore also include a technique of detecting loss of a communication link between a local server (e.g., host entity 104) and a remote server (e.g., another host entity or computer system 110). In response to loss of the communication link, the host entity 104-1 initiates local execution of a received function call in lieu of attempting to forward of the received function call to computer system 110 for execution even though the received function call otherwise would be forwarded to the computer system 110 for servicing. Upon detecting revival of the communication link between the host entity 104-1 and computer system 110, the host entity 104-1 initiates synchronization of repository 126-1 with repository 125 by forwarding data or corresponding modification information to computer system 110.

Figure 4:
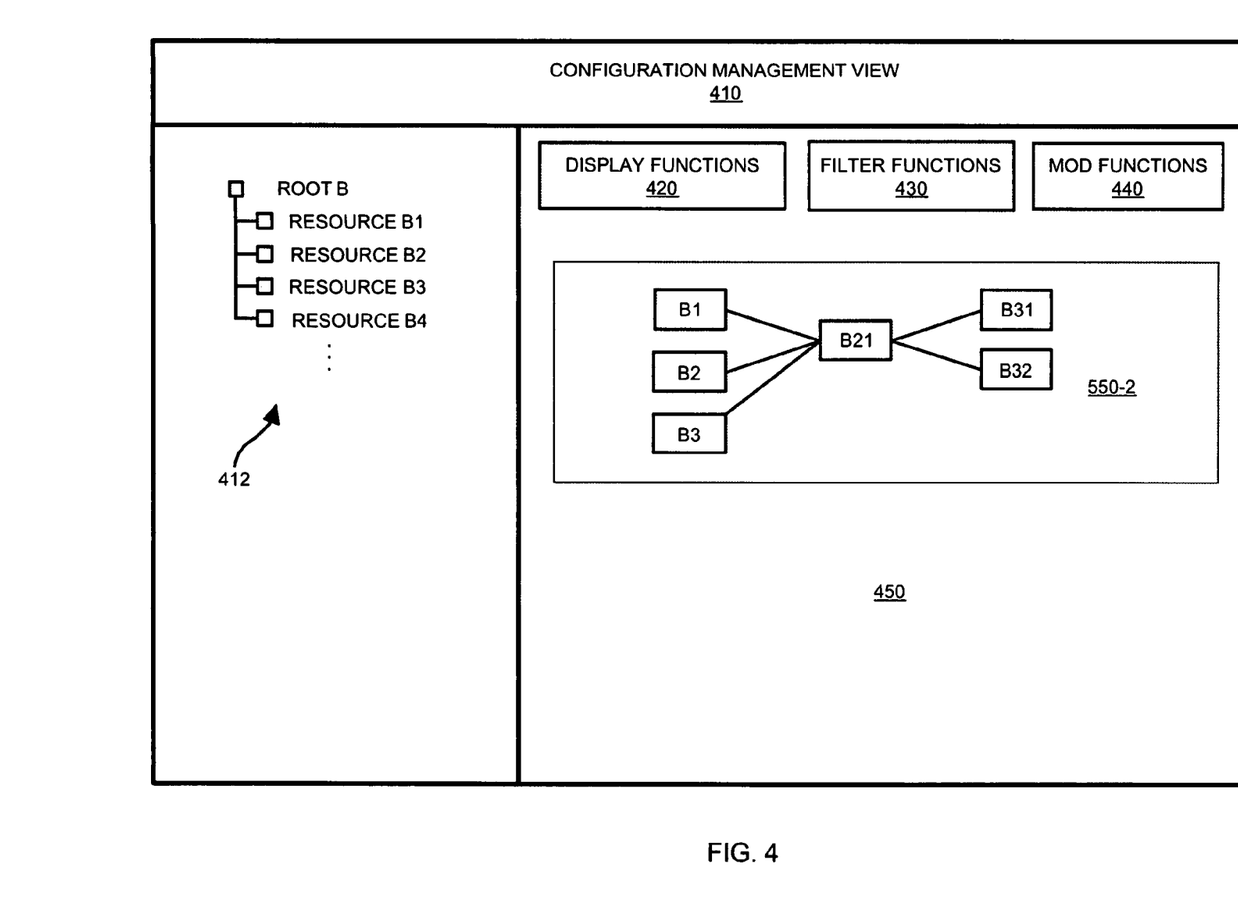
FIG. 4 is a diagram of a graphical user interface for display on a browser according to an embodiment herein.

FIG. 4 is a diagram of a configuration management view 410 is an example of a screenshot of graphical user interface 150-1 enabling a network administrator at station 105-1 to manage at least a portion of the storage area network environment 100 according to an embodiment herein.

Via the configuration management view 410, the user at station 105-1 can select resources from hierarchical tree 412 (e.g., a tree of resources managed by application 140-1) and view respective configuration information in display region 550 of configuration management view 410.

As shown, a user selects resource from hierarchical tree 412 and displays corresponding resources in display region 550. Filter functions 430 (e.g., selectable buttons) in configuration management view 410 enable the user to filter a selection of resources from hierarchical tree 412 that are to be viewed in display region 550. Display functions 420 in configuration management view 410 enable the user to select a respective type of view mode in which to display configuration information on display screen 130-1 for the user to view. In the present example, the respective user has selected to view resources according to a topology view mode associated with the storage area network environment 100. Thus, according to one embodiment, resource B1, B2, and B3 represent corresponding host entities 104, resource B21 represents a connectivity device such as a storage area network switch, and resources B31 and B32 represent corresponding storage system 175. Modification functions 440 enable the user to change configuration information or settings associated with the storage area network environment 100 such as those in display region 550.

In general, application 140-1 uses services 145 as discussed with respect to FIG. 1 in order to enable management of a respective storage area network resource via use of the functions supported by configuration view 410. For example, input to configuration management view 410 causes application 140-1 to issue the function calls to carry out different management tasks as previously discussed with respect to the other figures.

As previously mentioned, according to one embodiment, the host entities 104 and corresponding application 140 independently manage resources associated with a respective storage system 175 (e.g., Symmetrix™, Clarion™, etc.) while computer system 110 manages system level details such as zones, LUN masks, etc. associated with the storage area network environment 100. However, even though the host entities independently manage a respective resource such as a respective storage system 175, according to one embodiment, the host entities 104 still forward configuration information associated with the managed resources to the main server such as computer system 110. Thus, in some respects, the main server in storage area network environment 100 is subservient or depends on the host entities 104 to perform some tasks in storage area network environment 100.

Figure 5:
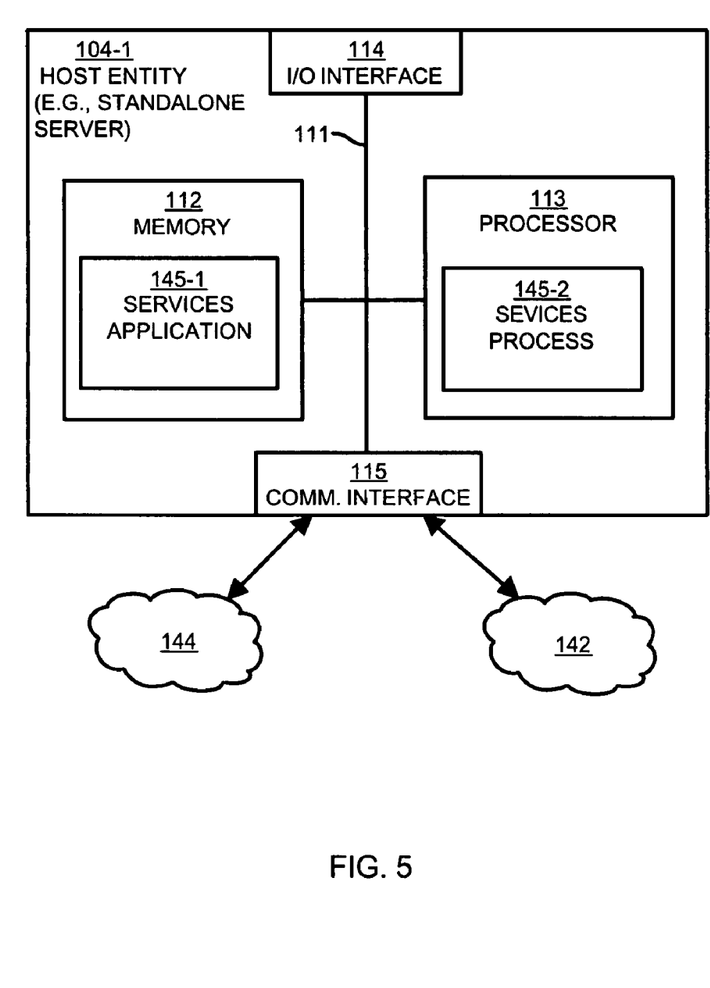
FIG. 5 is a diagram of an example computer system such as a server for executing techniques according to an embodiment herein.

FIG. 5 is a block diagram illustrating an example architecture of host entity 104-1 (e.g., a storage area network management station). Host entity 104-1 may be a digital processing device such as a personal computer, workstation, portable computing device, console, laptop, network terminal, etc.

As shown, host entity 104-1 of the present example includes an interconnect 111 that couples a memory system 112, a processor 113, an input/output interface 114, and a communications interface 115. Peripheral device (e.g., one or more viewer controlled devices such as a keyboard, mouse, etc.) associated with station 105-1 enables a user to provide input commands and thus generally control functions associated with graphical user interface 150-1.

As shown, memory system 112 is encoded with a services application 145-1 facilitating tasks such as retrieving, viewing, and managing configuration information associated with respective storage area network resources. Services application 145-1 may be embodied as software code such as data and/or logic instructions (e.g., code stored in the memory or on another computer readable medium such as a disk) that support processing functionality according to different embodiments described herein.

During operation, processor 113 accesses memory system 112 via the interconnect 111 in order to launch, run, execute, interpret or otherwise perform the logic instructions of services application 145-1. Execution of services application 145-1 produces processing functionality in services process 145-2. In other words, the services process 145-2 represents one or more portions of the services application 145-1 (or the entire application) performing within or upon the processor 113 in the computerized device 110. As discussed, one purpose of services is to facilitate management of resources such as managed objects in the storage area network environment 100.

It should be noted that the services 145 executed in host entity 104-1 can be represented in FIG. 5 by either one or both of the services application 145-1 and/or the services process 145-2. For purposes of this discussion, general reference will be made to the services as performing or supporting the various steps and functional operations to carry out techniques discussed herein.

It should also be noted that example configurations herein include the services application 145-1 itself (i.e., the un-executed or non-performing logic instructions and/or data). The services application 145-1 may be stored on a computer readable medium (such as a floppy disk), hard disk, or optical medium. The services application 145-1 may also be stored in a memory system 112 such as in firmware, read only memory (ROM), or, as in this example, as executable code in, for example, Random Access Memory (RAM). In addition to these embodiments, it should also be noted that other embodiments herein include the execution of services application 145-1 in processor 113 as the services process 145-2. Thus, those skilled in the art will understand that the host entity 104-1 may include other processes and/or software and hardware components, such as an operating system that facilitates carrying out management functions associated with the storage area network.

Figure 6:
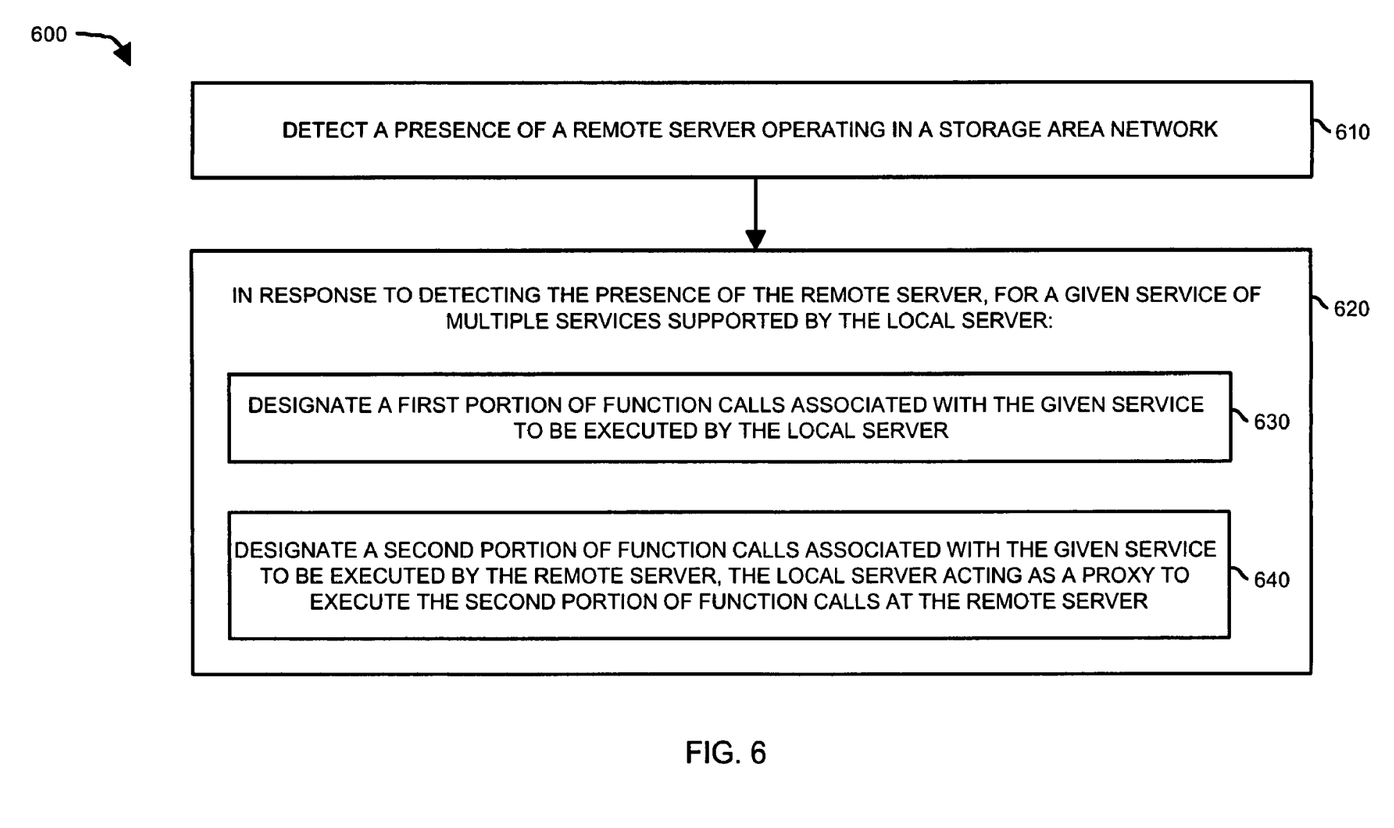
FIG. 6 is a flowchart illustrating a technique of sharing storage area network management duties according to an embodiment herein.

FIG. 6 is a flowchart 600 illustrating a technique of displaying configuration views according to an embodiment herein. Note that the following discussion of flowchart 600 overlaps with the concepts and techniques discussed above.

In step 610, host entity 104-1 or, more particularly, integrated services module 220 associated with host entity 104-1 detects a presence of a remote server operating in a storage area network.

In step 620, in response to detecting the presence of computer system 110, for a given service of multiple services supported by the host entity 104-1, the host entity 104-1 or, more particularly, the integrated services module 220: a.) designates (in sub-step 630) a first portion of function calls associated with the given service to be executed by the local server, and b.) designates (in sub-step 640) a second portion of function calls associated with the given service to be executed by the remote server. The host entity 104-1 acts as a proxy to execute the second portion of function calls at the computer system 110.

Figure 7:
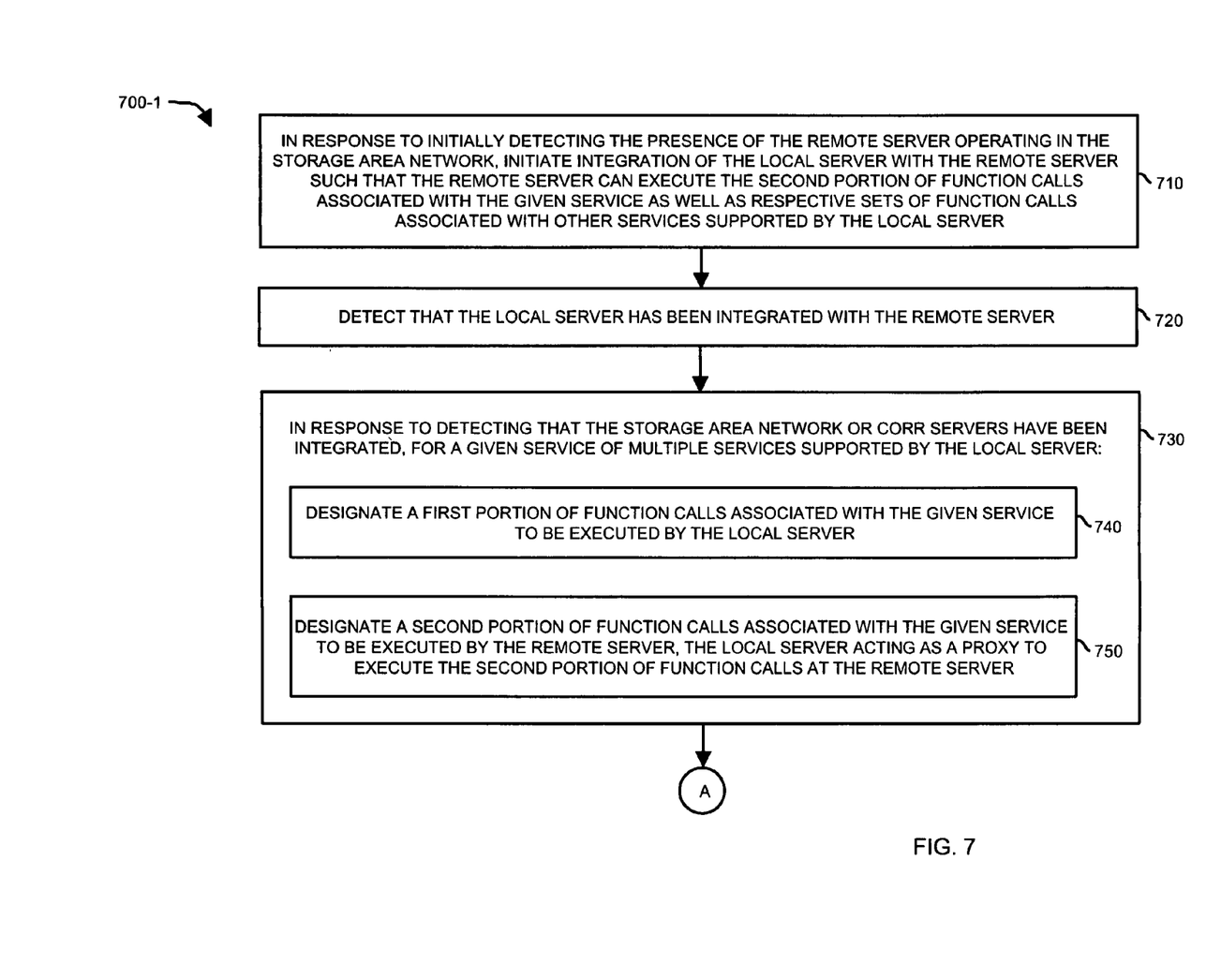
FIGS. 7 and 8 combine to form a flowchart illustrating a technique of sharing storage area network management duties among multiple servers according to an embodiment herein.
Figure 8:
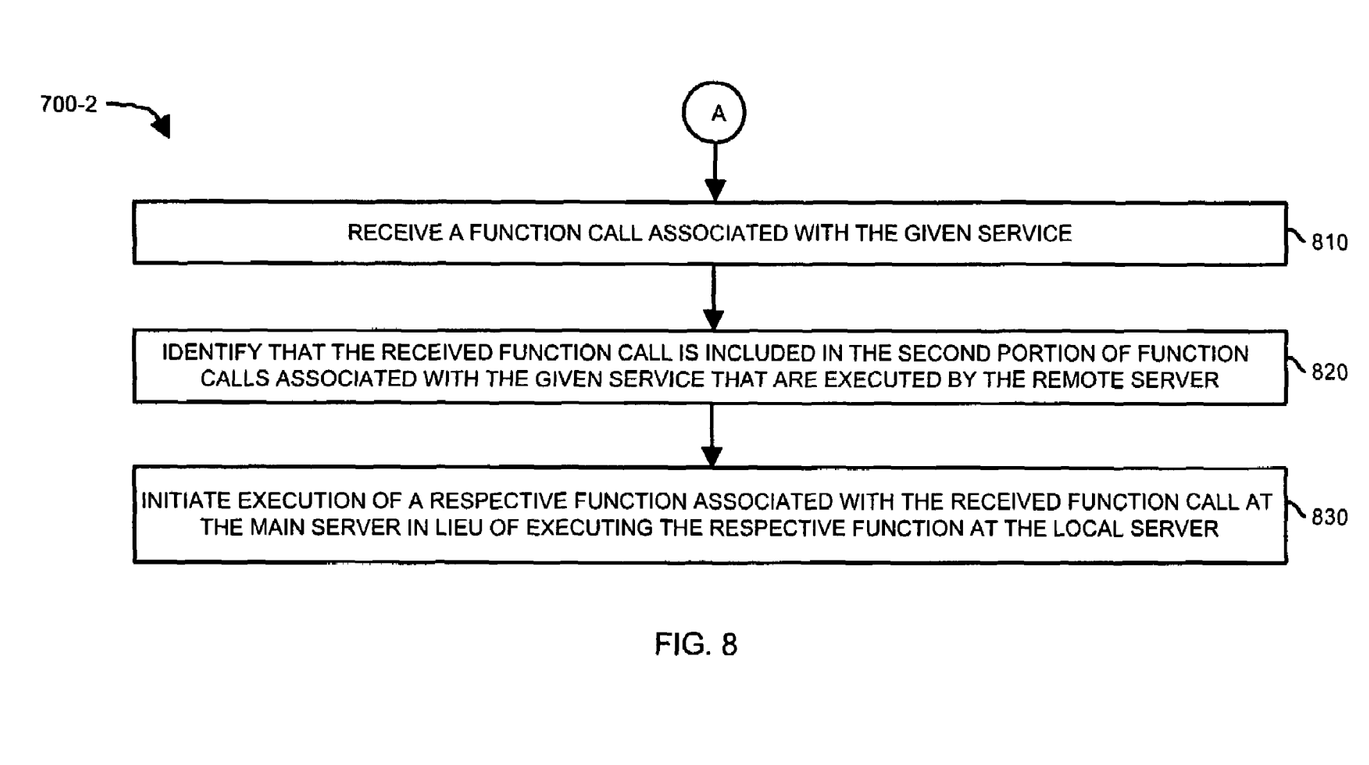

FIGS. 7 and 8 combine to form a more detailed flowchart 700 (e.g., flowchart 700-1 and flowchart 700-2) illustrating processing steps associated with host entity 104-1 and services 145.

In step 710 of FIG. 7, in response to initially detecting the presence of computer system 110 operating in the storage area network environment 100, a storage area network resource initiates integration of the host entity 104-1 with the computer system 110.

In step 720, the integrated services module 220 of host entity 104-1 detects that the host entity 104-1 has been integrated with computer system 110 via a query to integrated services module 220.

In step 730, in response to detecting that multiple servers in the storage area network 100 have been integrated, for a given service of multiple services 145 supported by the host entity 104-1, the integrated services module 220: i) designates a first portion of function calls associated with the given service to be executed by the host entity 104-1, and ii) designates a second portion of function calls associated with the given service to be executed by the computer system 110. The host entity 104-1 acts as a proxy to execute the second portion of function calls at the computer system 110.

In step 810 of FIG. 8, a specific one of the services 145 receives a function call from application 140-1.

In step 820, the specific service identifies that the received function call is included in the portion of function calls to be executed by the computer system 110.

In step 830, the specific service then initiates execution of a respective function associated with the received function call at the computer system 110 in lieu of executing the respective function at the host entity 104-1.

As discussed, techniques herein are well suited for use in applications such as management of storage area networks. However, it should be noted that configurations herein are not limited to use in such applications and thus configurations herein and deviations thereof are well suited for other applications as well.

While this invention has been particularly shown and described with references to preferred embodiments thereof, it will be understood by those skilled in the art that various changes in form and details may be made therein without departing from the spirit and scope of the invention as defined by the appended claims. Such variations are intended to be covered by the scope of this invention. As such, the foregoing description of embodiments of the invention is not intended to be limiting. Rather, any limitations to embodiments of the invention are presented in the following claims.

What is claimed is:

1. A computer-implemented method comprising:
   operating a first server, the first server being operated as a main server associated with a storage area network;
   at a second server, detecting whether the first server is present in the storage area network;
   at the second server, in response to detecting a presence of the first server in the storage area network, for a given service of multiple services supported by the second server: i) designating a first portion of function calls associated with the given service to be executed by the second server, and ii) designating a second portion of function calls associated with the given service to be executed by the first server, the second server acting as a proxy to execute the second portion of function calls at the first server;
   at the second server, prior to detecting the presence of the first server, designating both the first portion and the second portion of the function calls to be locally executed by the second server;
   at the second server, detecting loss of a communication link between the second server and the first server;
   at the second server, initiating local execution of a received function call in lieu of attempting to forward the received function call to the first server for execution even though the received function call is included in the second portion of function calls otherwise executed by the first server in the presence of a non-failing communication link;
   at the second server, upon detecting revival of the communication link between the second server and the first server, initiating synchronization of the second server with respect to the first server by forwarding data generated based on execution of the received function call to the first server; and
   at the second server, in response to initially detecting the presence of the first server operating in the storage area network, initiating integration of the second server with the first server such that the first server can execute the second portion of function calls associated with the given service.

2. A computer-implemented method as in claim 1, wherein the first server is configured as a single authoritative server amongst the multiple servers in the storage area network, the first server executing the second portion of function calls on behalf of the second server.

3. A computer-implemented method as in claim 1, wherein detecting the presence of the first server in the storage area network includes detecting that the second server has been integrated with the first server such that the first server can execute the second portion of function calls associated with the given service as well as respective sets of function calls associated with other services supported by the first server.

4. A computer-implemented method as in claim 1 further comprising:
   in response to initially detecting the presence of the first server operating in the storage area network, initiating integration of the second server with the first server such that the first server can execute the second portion of function calls associated with the given service.

5. A computer-implemented method as in claim 1 further comprising:
in response to detecting the presence of the first server operating in the storage area network, initiating integration of the second server with the first server such that the first server can execute the second portion of function calls associated with the given service as well as respective sets of function calls associated with other services supported by the second server, the first server being configured as a single authoritative server amongst multiple servers in the storage area network to execute the second portion of function calls as well as the respective sets of function calls associated with the other services.

6. A computer-implemented method as in claim 1 further comprising:
maintaining the multiple services in the second server as a set of common services that are also supported by at least one other of multiple servers in the storage area network, the set of common services including at least one of:
a) a user account management service,
b) an authorization service,
c) a reserve service,
d) an auditing service,
e) an event management service,
f) an alert management service,
g) a data synchronization service, and
h) a data collection policy service.

7. A computer-implemented method as in claim 1 further comprising:
at the second server, receiving a particular function call associated with the given service from a browser running an application at a remote location with respect to the second server;
identifying that the particular function call corresponds to one of the second portion of function calls associated with the given service;
in lieu of locally executing code associated with the particular function call at the second server, forwarding the particular function call over a network for execution of an application programming interface function associated with the particular function call at the first server, execution of the application programming interface function resulting in generation of a reply message by the first server to the second server;
receiving the reply message from the first server; and
forwarding information associated with the reply message to the browser initiating the call.

8. A computer-implemented method as in claim 1 further comprising:
receiving a particular function call from a browser running an application at a remote location with respect to the second server;
identifying that the particular function call corresponds to one of the first portion of function calls;
initiating local execution of an application programming interface function in the second server in response to receiving the particular function call at the second server;
storing generated data associated with the locally executed application programming interface function in a local repository managed by the second server; and
distributing the generated data to the first server for storage of the generated data in a repository managed by the first server.

9. A computer-implemented method as in claim 1 further comprising:
receiving a first function call associated with the given service from a browser running an application at a remote location with respect to the second server;
identifying that the first function call corresponds to one of the second portion of function calls associated with the given service;
in lieu of locally executing code associated with the first function call at the second server, forwarding the first function call over a network for execution of an application programming interface function associated with the first function call at the first server, execution of the application programming interface function resulting in generation of a reply message by the first server to the second server;
at the second server, receiving the reply message from the first server;
forwarding information associated with the reply message to the browser initiating the first function call;
receiving a second function call associated with the given service from the browser;
identifying that the second function call corresponds to one of the first portion of function calls;
initiating local execution of an application programming interface function at the second server in response to receiving the second function call at the second server;
storing generated data associated with the locally executed application programming interface function in a local repository managed by the second server; and
distributing the generated data to the first server for storage of the generated data in a repository managed by the first server.

10. A computer-implemented method as in claim 1 further comprising:
prior to integration of the second server with a corresponding main server in the storage area network, detecting that a respective main server is not present in the storage area network; and
for a given service of multiple services supported by the second server, designating function calls to be executed at the second server in lieu of forwarding the function calls to the respective main server of the storage area network.

11. The computer-implemented method as in claim 1 further comprising:
executing at least one function call of the function calls at the second server prior to learning the presence of the first server in the storage area network;
detecting presence of a remote resource that is capable of executing at least a portion of the function calls; and
wherein designating the second portion of function calls comprises designating the at least one function call for execution by the first server instead of execution by the second server.

12. The computer-implemented method as in claim 11, wherein execution of the given function call at the first server results in modifications to data in a first repository accessible by the first server, the computer-implemented method further comprising:
prior to completing the given function call at the first server and storing the modifications to data in the first repository, executing the given function call by setting up a background task to generate notification of the modifications to the second server, the notification to the second server enabling the second server to: i) store the modifications to data in a second repository accessible to the second server, and ii) synchronize the second repository with the first repository.

13. The computer-implemented method as in claim 1, wherein the second server is configured to receive a request to execute a given function call;
   in response to receiving the request, the second server accessing an integrated services module to determine whether the second server has been integrated with the first server;
   responsive to detecting that the second server has not been integrated with the first server, initiating execution of the given function call at the second server in lieu of forwarding the given function call to the first sever; and
   responsive to detecting that the second server has been integrated with the first server via designation of the second portion of the function calls to be executed by the first server, initiating execution of the given function call at the first server.

14. The computer-implemented method as in claim 13, wherein the first server is a main server that executes function calls for multiple different servers, the multiple different servers including the second server and at least one other server that communicates with the main server to execute function calls.

15. A system for managing a storage area network, the system comprising:
   a first server that includes a processor and operates as a main server associated with the storage area network;
   a second server that supports operations of:
      detecting whether the first server is present in the storage area network;
      in response to detecting a presence of the first server in the storage area network, for a given service of multiple services supported by the second server: i) designating a first portion of function calls associated with the given service to be executed by the second server, and ii) designating a second portion of function calls associated with the given service to be executed by the first server, the second server acting as a proxy to execute the second portion of function calls at the first server;
   wherein the second server further supports operations of:
      prior to detecting the presence of the first server, designating both the first portion and the second portion of the function calls to be locally executed by the second server;
   wherein the second server further supports operations of:
      detecting loss of a communication link between the second server and the first server;
      initiating local execution of a received function call at the second server in lieu of attempting to forward the received function call to the first server for execution even though the received function call is included in the second portion of function calls otherwise executed by the first server in the presence of a non-failing communication link;
   wherein the second server further supports operations of:
      upon detecting revival of the communication link between the second server and the first server, initiating synchronization of the second server with respect to the first server by forwarding data generated based on execution of the received function call to the first server; and
   wherein the second server further supports operations of:
      in response to initially detecting the presence of the first server operating in the storage area network, initiating integration of the second server with the first server such that the first server can execute the second portion of function calls associated with the given service.

16. A system as in claim 15, wherein detecting the presence of the first server includes detecting that the first server is configured as a main server among the multiple servers, the main server being configured as a single authoritative server amongst the multiple servers in the storage area network to execute the second portion of function calls on behalf of the second server; and
   wherein the second server further supports operations of:
      receiving a particular function call associated with the given service;
      identifying that the particular function call is included in the second portion of function calls associated with the given service; and
      initiating execution of a respective function associated with the particular function call at the main server in lieu of executing the respective function at the second server.

17. A computer program product including a physical computer readable storage medium having instructions stored thereon for processing data information, such that the instructions, when carried out by a processing device, enable the processing device to perform operations of:
   at a second server, detecting whether a first server is present in the storage area network, the first server being a main server in the storage area network;
   at the second server, in response to detecting a presence of the first server in the storage area network, for a given service of multiple services supported by the second server: i) designating a first portion of function calls associated with the given service to be executed by the second server, and ii) designating a second portion of function calls associated with the given service to be executed by the first server, the second server acting as a proxy to execute the second portion of function calls at the first server;
   at the second server, prior to detecting the presence of the first server, designating both the first portion and the second portion of the function calls to be locally executed by the second server;
   at the second server, detecting loss of a communication link between the second server and the first server;
   at the second server, initiating local execution of a received function call at the second server in lieu of attempting to forward the received function call to the first server for execution even though the received function call is included in the second portion of function calls otherwise executed by the first server in the presence of a non-failing communication link;
   at the second server, upon detecting revival of the communication link between the second server and the first server, initiating synchronization of the second server with respect to the first server by forwarding data generated based on execution of the received function call to the first server; and
   at the second server, in response to initially detecting the presence of the first server operating in the storage area network, initiating integration of the second server with the first server such that the first server can execute the second portion of function calls associated with the given service.

* * * * *